United States Patent [19]

Karlsson

[11] 4,168,812
[45] Sep. 25, 1979

[54] CONTROL MECHANISMS FOR DISENGAGING THE LINE SPOOL IN FISHING REELS

[75] Inventor: Jarding U. Karlsson, Svängsta, Sweden

[73] Assignee: ABU Aktiebolag, Svängsta, Sweden

[21] Appl. No.: 779,103

[22] Filed: Mar. 18, 1977

[30] Foreign Application Priority Data

Mar. 25, 1976 [SE] Sweden .................................. 7603619

[51] Int. Cl.$^2$ ............................................ A01K 89/015
[52] U.S. Cl. ................................................... 242/220
[58] Field of Search ............... 242/218, 217, 220, 211, 242/84.1 R

[56] References Cited

U.S. PATENT DOCUMENTS

| 781,776 | 2/1905 | Leaver | 242/211 |
|---|---|---|---|
| 2,130,581 | 9/1938 | Case | 242/220 |
| 2,652,991 | 9/1953 | Murvall | 242/220 |
| 3,916,715 | 11/1975 | Covey | 242/211 |

Primary Examiner—George F. Mautz
Attorney, Agent, or Firm—Karl W. Flocks

[57] ABSTRACT

The invention relates to a control mechanism for disengaging the line spool of a fishing reel of the type having a rotatable line spool and a disengageable clutch in the transmission between the crank handle and the spool, the clutch being automatically movable to engaged position by means of the crank handle and being disengageable against the spring force by operation of the control mechanism, which comprises a slidable disengaging means operable through cam means by operating means comprising a key pivotally mounted on the reel behind and in parallel with the line spool.

3 Claims, 3 Drawing Figures

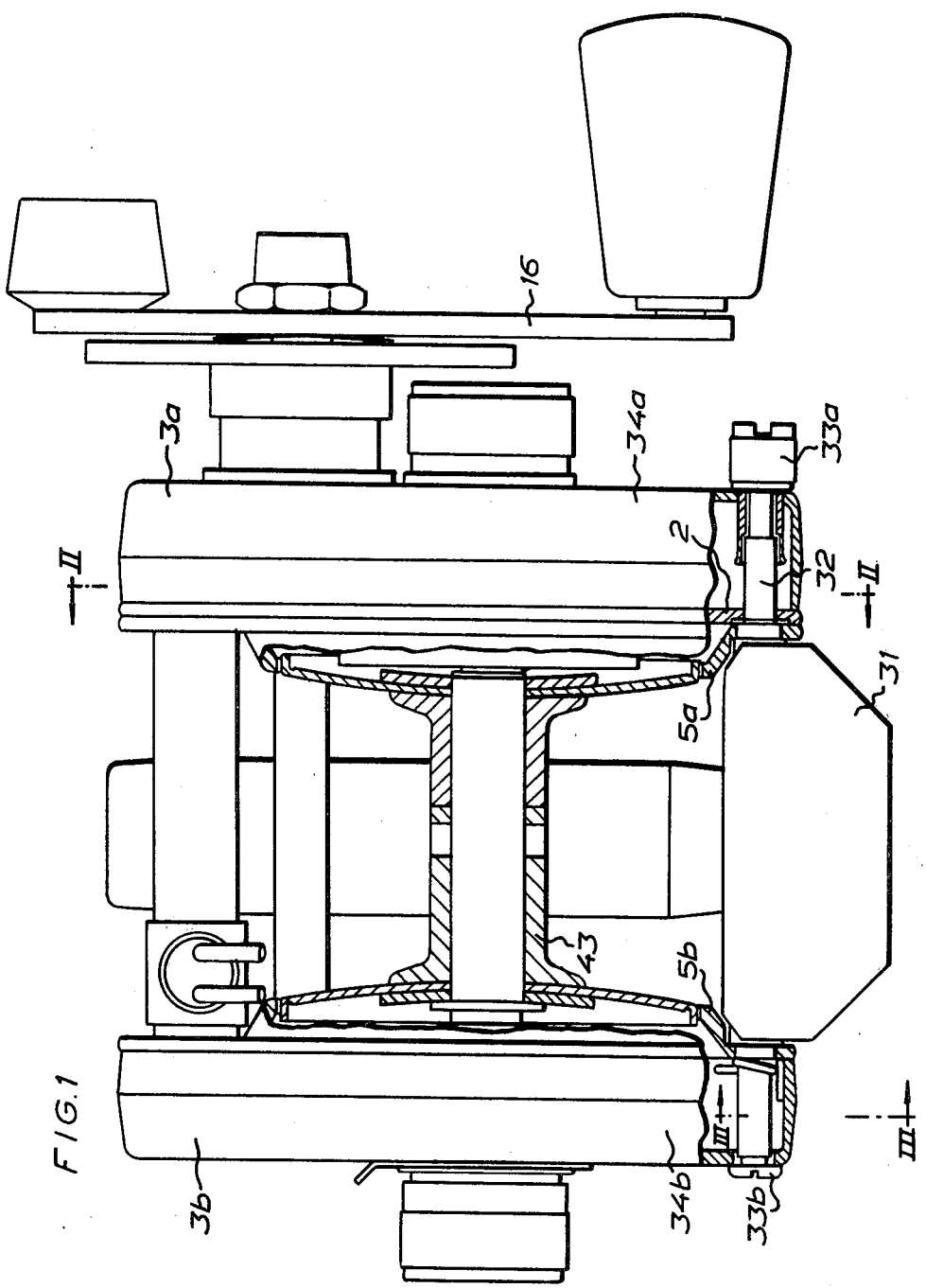

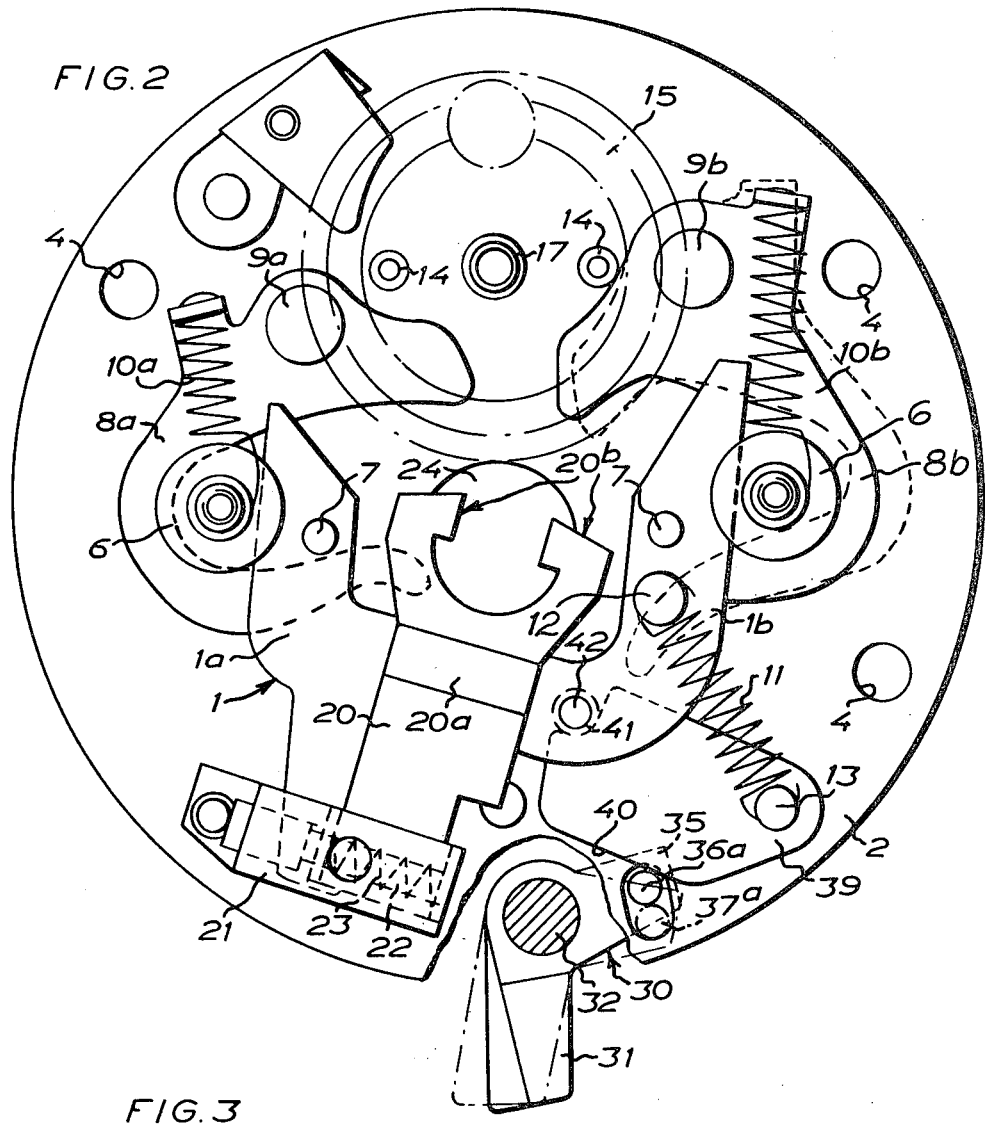
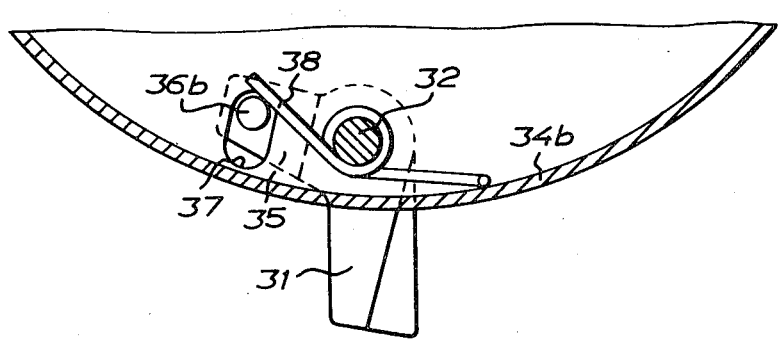

CONTROL MECHANISMS FOR DISENGAGING THE LINE SPOOL IN FISHING REELS

This invention relates to control mechanisms for disengaging the spool in fishing reels of the type in which the spool is driven by means of the crank handle via a drive transmission including a clutch which is disengageable by operation means of the control mechanism and re-engageable by actuation of the crank handle.

Clutches of this kind are usually mounted in a casing at the rear end portion of the reel frame which forms a housing for the transmission between the crank and the line spool. Usually, the control mechanism comprises a control lever for disengaging the clutch in a position on the reel to be easily accessible for the thumb of the hand ("rod hand") holding the fishing rod behind the reel during casting but during the initial moment of a cast in which moment the line spool is disengaged and freely rotatable the angler desires and usually needs to retain the line on the spool by exerting with the thumb of the rod hand a pressure on the spool in order to prevent the line from running out prematurely. Quite often the disengaging operation is therefore carried out with the left hand although this is inconvenient.

It is desirable and, in fact, has already been suggested to place the clutch disengaging means behind the line spool in a position for easy actuation by the thumb of the rod hand without moving the hand from the rod. It is, however, desirable that the disengaging means may be operated easily by the angler's rod hand thumb even when the angler at the same time retains the line spool with this thumb by exerting pressure on the spool.

Accordingly, one object of this invention is to provide a control mechanism for disengaging the line spool of a fishing reel of the type having a rotatable line spool, a crank handle and a drive mechanism comprising at least one rotatable element for rotating the spool by means of the crank handle and including a disengageable clutch, said clutch comprising an axially slidable clutch member adapted to be disengaged from and engaged with the line spool by means of said control mechanism and said control mechanism comprising a latching mechanism having spring means for maintaining the clutch in disengaged position and a manually actuable disengaging arm for disengaging the clutch against the action of said spring means, said latching mechanism being releasable by actuation of said element which is rotatable by means of the crank for re-engagement of the clutch by the action of said spring means, the control mechanism comprising a disengaging lever pivotally mounted on a wall member of the fishing reel and a pivotable disengaging key for operation of the lever and supported behind and opposite to the line spool to permit operating the clutch via at least said lever and said arm for disengaging the clutch.

Another most important desideratum is to make it possible, with a minimum of modifications, to combine a disengaging means arranged in the above manner with a clutch of the commonest and best design hitherto known, viz. the type of disengagement of the basic design disclosed in Swedish Patent Specification No. 145,127 and in one or more of the patents to Borgström, issued Nov. 29, 1949, Murvall U.S. Pat. No. 2,652,991, issued Sept. 22, 1953, and Murvall U.S. Pat. No. 3,532,296, issued Oct. 6, 1970 and used in the Ambassadeur 5000 and 6000 series of fishing reels manufactured at Svängsta, Sweden, by ABU Aktiebolag.

In this known type of clutch mechanism and control mechanism the spool can be disengaged from the drive mechanism by means of a hand operated lever and re-engaged by actuation of the crank handle. In the disengaged state the spool can rotate freely in its bearings. Besides, these previously known clutch and clutch control mechanisms are so arranged that the control mechanism can always be operated for disengaging the spool irrespective of the position of the crank because the disengaging means of the control mechanism comprises two pivotally mounted locking arms actuable by the crank handle and adapted each to keep a manually actuable disconnecting arm in disconnected position by means of abutments on the disengaging arm.

Another important object of the invention is to adapt and improve a clutch mechanism of the character described above for the combination thereof with an easily accessible control mechanism in which the disengaging arm and the latching mechanism are movable in relation to each other, said latching mechanism further comprising spring-biased latching arms and a displaceably supported yoke having legs for cooperation with the spring-biased latching arms which are adapted after release of the clutch to retain the control mechanism with the clutch in disengaged position against the action of the spring bias to be released by said element which is rotatable by the crank handle when the crank handle is rotated to permit the spring bias to return the clutch and the control mechanism into engaging position, all elements of said control mechanism being supported on a supporting plate, said lever being pivotally mounted on a pin fixed on the supporting plate and having means in abutment with cooperating means on said yoke for transmitting movement between the latter and the disengaging key, said disengaging key having at the end thereof close to said supporting plate a projection which is eccentrically positioned relative to the pivot axis of the key, said lever being pivotable by said projection of said key when the key is pivoted for disengagement by said lever, when so pivoted, by the action of said means on said yoke displacing said yoke thereby establishing retaining engagement between the yoke legs and the latching arm during simultaneous displacement of the disengaging arm to the disengaging position.

These and other objects of the invention and characteristics thereof will be described in greater detail in the course of the following description thereof with reference to the accompanying drawings, in which:

FIG. 1 is a side elevation and partially sectional view of a fishing reel provided with a control mechanism according to the invention for disengaging the clutch between the drive mechanism and the line spool;

FIG. 2 is a cross-sectional view on line II—II of FIG. 1, showing the clutch control mechanism as seen against the spool shaft after dismounting the outer rear end housing shown in FIG. 1; and FIG. 3 is a fragmentary cross-sectional view on line III—III of FIG. 1.

The disengaging means illustrated in FIG. 2 to which means the control mechanism of the invention has here been applied by way of example, agrees in principle with the disengaging means disclosed in Swedish Patent Specification No. 145,127. It should be noted, however, that the mechanism of the invention is also applicable to designs which may be called modifications of said prior-art disengaging means, for example the design according to Swedish Pat. No. 386,808.

The illustrated disengaging means comprises a disengaging arm 1 which is slidably mounted on a supporting plate 2 in the right-hand end wall housing 3a in FIG. 1. The supporting plate 2 is provided with apertures 4 so that it can be mounted on the bolts of an annular frame element 5a. The arm 1 is in the form of a yoke having two legs 1a, 1b which are guided at their opposite outer edges in the grooves of two guide members 6 attached to the plate 2. The yoke legs 1a, 1b each have one pin 7 for cooperation with two spring-biased latching arms 8a, 8b. These arms are journalled on pins 9a, 9b on the plate 2 and their biasing springs 10a, 10b urge said arms into positions in which they are swung inwardly towards the center and abut against the pins 7 on the yoke legs, thereby holding the yoke 1 in a radially inner position against the action of a return spring 11 which is interposed between a spring attachment 12 on the yoke 1 and a spring attachment 13 on the plate 2. By means of two diametrically arranged abutments 14 on an element 15 which is supported by a shaft 17 driven by the crank handle 16, first one and then the other latching arm 8a and 8b, respectively, can be pivoted against the action of the spring bias on the respective latching arm to an outer position in which the latching arms are withdrawn from the pins 7 on the legs 1a, 1b of the yoke and when both latching arms are withdrawn in this way the return spring 11 can pull the yoke radially outwards. This outer position of the yoke 1 corresponds to the engaged state of the clutch while the radially inward position of the yoke 1 corresponds to the disengaged state of the clutch (position shown in FIG. 2).

The disengaging means so far described corresponds to that of the above-mentioned Swedish Patent Specification No. 145,127 and, apart from the control mechanism of the present invention and the modifications conditioned by this control mechanism, it could correspond to the prior-art clutch also in other respects.

However, in the embodiment shown the yoke 1 is designed to act upon a separate clutch fork 20 which is mounted for pivotment on a shaft 22 fixed to a holder 21 so that the radially inner fork end is swung towards and away from the plate 2. The clutch fork 20 is spring-biased by means of a spring 23 mounted on the shaft 21 so as to be swung inwardly towards plate 2 and the fork ends engage a groove in an axially movable clutch member 24 which is driven by the crank handle via a gear transmission and engages, in an axially inner position, with a clutch member fixed to the line spool shaft, for instance in accordance with the specification of Swedish Pat. No. 145,127 or the above-mentioned Swedish Pat. No. 386,808. When displaced inwardly the yoke 1 acts upon an inclined cam surface 20b of the clutch fork of FIG. 2 for displacing the clutch fork radially inwardly while the clutch fork simultaneously pivots axially outwardly for withdrawing the clutch member 24 from the clutch member supported by the spool shaft. Disengagement has thus been carried out.

In conventional disengaging means of this kind the yoke 1 has at its radially outer end a prolongation which extends out of the right-hand end wall housing 3a and can be pressed inwardly for disengagement by means of the thumb or a finger. Re-engagement is effected in the manner described above by turning the crank handle 16.

According to the present invention, however, said disengaging means is operated for disengagement by means of a control mechanism generally designated 30. The control mechanism 30 includes a key 31 pivotally mounted on a shaft 32 which is fixed to the two annular frame members 5a, 5b and may be formed of the rods which normally connect the frame members 5a, 5b and whose prolonged parts serve as attachments for the mounting screws or nuts 33a, 33b connecting the end walls 34a, 34b with the frame 1. Instead of the through shaft 32 it is of course possible to mount the disengaging key 31 on journals.

The key 31 has on its hub a laterally directed wing-shaped portion 35 which at either end has a projecting pin 36a, 36b. The pins extend through slots 37 in the frame members 5a, 5b, and the right-hand pin 36a also extends through a corresponding slot 37a in the support plate 4. The slots are generally radial, which appears from FIGS. 2 and 3. A spring 38, which is mounted on the shaft 32 and is interposed with its ends between the pin 36b and the inside of the end wall 34b, acts upon the pin 36b extending into the left-hand end wall housing 3b. The spring tends to pivot the disengaging key 31 in a direction away from the position shown in FIG. 3, which corresponds to the disengaging position of the clutch, in anti-clockwise direction to an end position in which the pins 36a, 36b bear against the radially outer ends of the slots.

The pin 36a shown in FIG. 2, which is supported at the right-hand end of the key wing 35 as seen in FIG. 1, is adapted, for disengagement, to act upon a lever 39 which is pivotally mounted on the pin 13 forming one of the attachments for the spring 11. The key pin 36a bears against a cam surface 40 on the lever 39 which, by another cam surface 41 at its end opposite to the pin 13, cooperates with a pin 42 fixed to one leg 1a or a web of the yoke 1. The lever 39 is adapted to be pivoted by means of the disengaging key 31 in clockwise direction in FIG. 2 about the pin 13 and the lever 39 and its cam surface 40 are so formed that the cam surface 41 urges the yoke 1 radially inwardly to the disengaged position shown in FIG. 2. When the clutch is re-engaged by turning of the crank handle 16 in the manner described above the yoke 1 is displaced radially outwardly, thereby pivoting the lever 39 anti-clockwise by the intermediary of the pin 42, and at the same time the disengaging key 31 is swung away from the position shown by full lines into the position in which the key is indicated by broken lines in FIG. 2. Re-engagement is thus effected automatically by turning of the crank handle in the same manner as in prior-art disengaging units.

It is apparent from the foregoing that the invention has solved the problem of modifying the conventional disengaging means in the simplest possible way so as to permit operation by means of a disengaging key. The modification involves that the operating member of the yoke 1, which extends radially out of the end wall housing 3a in conventional units, is eliminated and replaced by the disengaging key 31 and an intermediate link (lever 39) for actuation of the yoke 1. The arrangement of the disengaging arm 20 for cooperation with the yoke 1 and the spring 23 need no modification, and neither does the fundamental embodiment of the yoke 1 and the latching arms 8a, 8b nor the cooperation of the latching arms with the crank-driven element 15 and its abutment pins 14.

The disengaging key is carried on its shaft 32 in a comparatively low position behind the line spool 43 and is so formed that it can be conveniently operated by the base part of the thumb of the hand holding the rod behind the reel while the top part of the thumb can be used for retaining the line on the line spool. Thus, it is not necessary to move the thumb in order to retain the line when disengagement is to be carried out but even if the angler for the sake of convenience should want to change the position of the thumb after the disengaging operation to reach the most convenient position for retaining the line, the required movement is extremely small.

The control mechanism 30 described above can be used for operating disengaging means of the type described in the above-mentioned Swedish Pat. No. 386,808 by a simple modification of the lever 39 acting on the means for operating the disengaging mechanism.

The return spring 38 of the embodiment described above may be placed in the right-hand end wall housing 3a instead of the left-hand end wall housing 3b and, if desired, it may be dispensed with since a certain retraction power may also be provided by the spring 11 which, through its effect on the yoke 1, can also actuate the lever/intermediate link 39, which acts with its cam surface 40 upon the disengaging key 31 via the pin 36a.

It should be particularly observed that the control mechanism 30 of invention can be used in almost any conventional disengaging units without making it necessary to rearrange the components of the disengaging unit, whose mounting positions are predetermined, for operation by means of the disengaging key 31 instead of the conventional control knob on the end wall housing 3a. A great advantage resides in the fact that the pivotable link or lever 39 provides such a transmission ratio between the control key and the yoke 1/clutch fork 20 that the pivot angle of the control key for disengagement may be so small that the thumb can without difficulty retain the line on the spool during the operation of the control key.

It should also be observed that substantially the same spring equipment may be used as in conventional disengaging means. The only additional spring used in the embodiment shown is the spring 38 which may, however, be dispensed with.

What I claim and desire to secure by Letters Patent is:

1. Control mechanism for disengaging the line spool of a fishing reel of the type having a rotatable line spool, a crank handle and a drive mechanism comprising at least one rotatable member for rotating the line spool by means of the crank handle and including a disengageable clutch, said clutch comprising an axially movable clutch member which is movable from and to disengaged and engaged positions in relation to said line spool by means of a control mechanism, said control mechanism comprising a slidably mounted member having a pair of spaced apart legs and being slidable between first and second positions for moving said clutch member between engaged and disengaged positions, respectively, a returning spring means connected to said slidably mounted member, operating means supported by the slidably mounted member for moving the latter from said first to said second position against the action of the returning spring means, a pair of rotatably mounted lever arms, return spring means connected to each of said lever arms, said rotatably mounted member, which is rotatable by means of the crank handle, having a pair of triggering elements supported for movement in circular paths when the rotatably mounted member is rotated, said lever arms being positioned at either side of said rotatably mounted member, said lever arms and said legs having cooperating interengagement means for releasably locking said legs to retain the control mechanism with said clutch in disengaged position when said clutch member is moved to said disengaged position by said slidably mounted member when the latter is moved to said second position against the action of the returning spring means which are connected to said lever arms, said interengagement means of said legs being released from the interengagement means of said lever arms by said triggering elements when said rotatably mounted member is rotated by the crank handle to permit the spring means connected to the lever arms to return the control mechanism and the clutch into engaging position, said control mechanism further comprising a pivotally mounted manually operable clutch disengaging key having a thumb operative surface extending in parallel with and spaced from the line spool and an operating arm supported thereby, a lever means being pivotally mounted for cooperation with said operating arm of said key and with said operating means of said slidably mounted member to be operated by said operating arm when said key is operated for disengaging the clutch and, by acting on said operating means of the slidably mounted member, to move the latter into said second position, thereby moving the clutch into said disengaging position against the action of said returning spring means connected to the slidably mounted member.

2. A control mechanism in a fishing reel as claimed in claim 1 further characterized by the fishing reel having a frame comprising two annular frame members situated on either side of the line spool and spaced from the latter, at least one rod extending in parallel with and spaced from the line spool and connecting said annular frame members, a supporting plate mounted on one of said frame members, said rod having one end extension forming an attachment means for said supporting plate, wherein said disengaging key is pivotally supported on said connecting rod, and spring means for biasing said key towards a disengaging position.

3. A control mechanism as claimed in claim 1, wherein said returning spring means also provides return means for said key by acting upon the latter through said slidably mounted member and said lever means.

* * * * *